United States Patent [19]

Pratt

[11] Patent Number: 5,165,591
[45] Date of Patent: Nov. 24, 1992

[54] DIFFUSION BONDING

[75] Inventor: Anthony L. Pratt, Bristol, England

[73] Assignee: Rolls-Royce plc, England

[21] Appl. No.: 805,330

[22] Filed: Dec. 10, 1991

[30] Foreign Application Priority Data

Dec. 20, 1990 [GB] United Kingdom ............... 9027586

[51] Int. Cl.$^5$ ............................................. B23K 20/14
[52] U.S. Cl. .................................. 228/193; 228/243;
228/263.21; 228/237
[58] Field of Search ............... 228/193, 221, 219, 243,
228/263.21, 232

[56] References Cited

U.S. PATENT DOCUMENTS

| | | | |
|---|---|---|---|
| 4,096,615 | 6/1978 | Cross | 228/193 X |
| 4,581,300 | 4/1986 | Hoppin, III et al. | 228/193 X |
| 5,009,359 | 4/1991 | Stover et al. | 228/193 X |

FOREIGN PATENT DOCUMENTS

| | | | |
|---|---|---|---|
| 591285 | 2/1978 | U.S.S.R. | 228/243 |
| 1523197 | 8/1978 | United Kingdom . | |

Primary Examiner—Kenneth J. Ramsey
Attorney, Agent, or Firm—Oliff & Berridge

[57] ABSTRACT

Two titanium alloy turbine components are diffusion bonded together by preparing mating surfaces of the components to a high degree of smoothness, putting the surfaces in mating abutment, placing the components within a yoke in a vacuum furnace, evacuating the furnace, increasing the temperature of the furnace to about 960° C., applying pressure across the interface between the components by means of a pressure bag between the yoke and the components, maintaining the vacuum, temperature and pressure for about 30 minutes, back filling the furnace with argon, increasing the pressure of argon to about 1000 atmospheres, maintaining that pressure and temperature for about two hours, and then reducing the pressure to atmospheric and removing the diffusion bonded components from the furance.

6 Claims, 1 Drawing Sheet

DIFFUSION BONDING

FIELD OF THE INVENTION

This invention concerns improvements in or relating to diffusion bonding of materials and in particular concerns hot isostatic joining under pressure of metal components such as gas turbine engine parts.

"Metal" in the context of this invention includes not only elementary metals but metal alloys per se and alloys of metals with ceramic material. The metal may be in the form of sintered powder, a casting, or a forging.

BACKGROUND OF THE INVENTION

It is known to use hot isostatic pressure techniques to diffusion bond metal parts together. Diffusion bonding occurs when two mating surfaces are pressed together under temperature, time and pressure conditions that allow interchange of atoms across the interface. It is necessary that the surfaces to be joined are clean and that the variables of temperature, pressure and time are closely controlled, so that the necessary interchange of atoms may be achieved.

Hot isostatic pressing ("HIPping") is the application of high pressure gas (e.g. argon) at high temperature within a pressure vessel to the components to be joined. Gas pressure is applied isostatically so that there are minimal or no changes to the geometry of the components being joined. HIPping causes the collapse of internal porosity and the reduction of microporosity. Sintered powder and cast materials alike can be densified and consolidated, causing improved strength characteristics.

A HIP diffusion bonding process requires the efficient sealing of the components with a vacuum at their interface. This has hitherto been carried out outside the HIP vessel in a preliminary step with a vacuum pump and pipe. This is done by welding the edges of the components round the interface, welding a vacuum pumping pipe to the component, and evacuating the joint at temperature. The pipe is then sealed and the joint non-destructively tested to make sure the vacuum within the joint is intact. The joint between the components after this preliminary step is fragile, and great care has to be taken in moving the joined components to the apparatus where the HIP diffusion bonding process is to be carried out.

It is an object of the present invention to do away with the above-mentioned preliminary step and its attendant disadvantages.

SUMMARY OF THE INVENTION

According to the present invention there is provided a method of diffusion bonding together two metal components comprising the steps of:

(a) preparing mating surfaces of two components to be diffusion bonded to a condition such that diffusion bonding across the interface between the surfaces is possible, (b) applying the two components to each other so that the surfaces are in mating abutment, (c) placing the two components with the surfaces in mating abutment in a vacuum furnace, (d) evacuating the furnace, (e) increasing the temperature of the furnace to a predetermined temperature, (f) applying pressure across the interface between the components, (e) maintaining the vacuum, temperature and said pressure within the furnace for a first predetermined period of time, (f) back filling the furnace with an inert gas when said first predetermined period of time is complete, (g) increasing pressure of said gas to a predetermined pressure, (h) maintaining said predetermined pressure and temperature for a second predetermined period of time, (i) reducing the pressure to atmospheric when the second predetermined period of time is complete, and (j) removing the diffusion bonded components from the furnace.

Preferably, placing the components in the furnace includes placing the components in a yoke within the furnace, there being provided means to apply pressure between the yoke and the components.

The means to apply pressure between the components and the yoke may be a gas-filled container of flexible sheet material located between the components and the yoke whereby increase of temperature in the furnace will increase the pressure within the container and thereby increase the pressure between the yoke and the components.

The preparation of the mating surfaces preferably includes preparing the surfaces to a smoothness of 1 micron or better, followed by chemical cleaning.

Preferably, the evacuation of the furnace is to $10^{-4}$ Torr pressure or less.

Where the components are made of a titanium alloy the temperature is preferably 960° C., the first predetermined period of time is about 30 minutes, the predetermined gas pressure is about 15000 psi, and the second predetermined period of time is about 2 hours.

BRIEF DESCRIPTION OF THE DRAWING

The invention will now be described by way of example only with reference to the accompanying diagrammatic drawing (FIG. 1) which is a schematic section through a vacuum furnace for diffusion bonding metal components.

SPECIFIC DESCRIPTION

Figure 1:
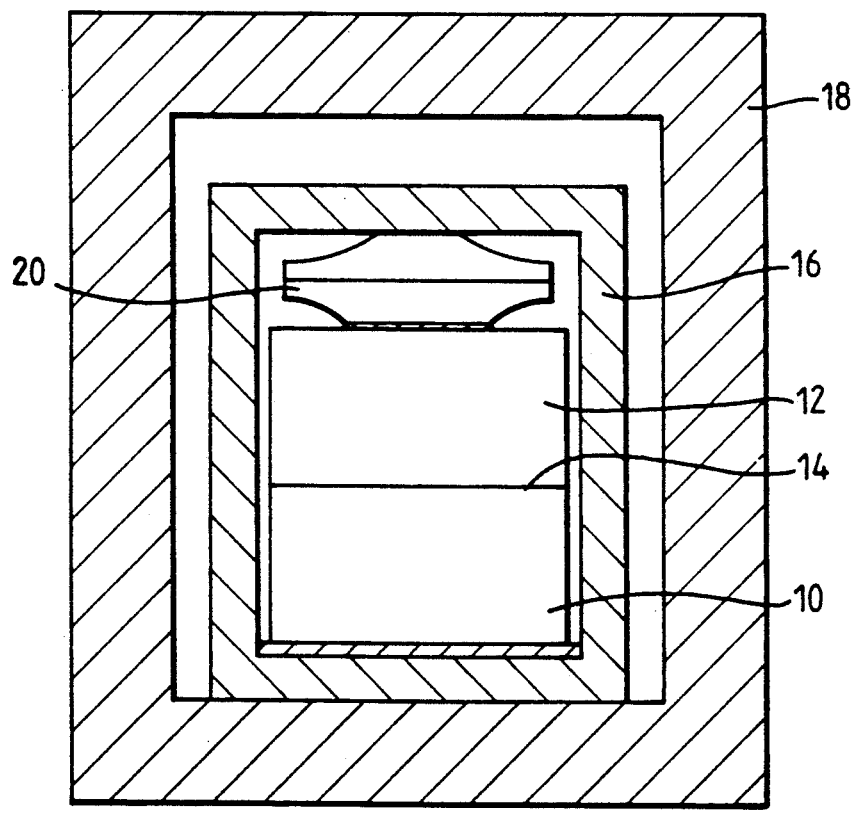

Two cast titanium alloy gas turbine components 10, 12 (e.g. turbine discs) which are to be diffusion bonded together initially have their mating surfaces prepared to a smoothness of 1 micron or better and chemically cleaned. The components are then put in abutment at an interface 14 between the mating surfaces and placed in a yoke 16 within a vacuum furnace 18.

Between the yoke 16 and the top of component 12 is provided a pressure container or bag 20 made of sheet steel and filled with a gas.

The furnace is evacuated to about $10^{-4}$ Torr and the temperature increased to about 960° C. The pressure bag 20 expands and presses the two components 10, 12 together by virtue of expansion of the bag 20 against the yoke 16. The vacuum, temperature and pressure are maintained for about 30 minutes after which time the components are sealed together.

The furnace is then back filled with high purity argon to a pressure of about 15000 psi (1000 atmospheres). The temperature of 960° C. and this pressure are maintained in the furnace for a further two hours. This ensures that any porosities in the casting are removed.

The pressure is then released and the components 10, 12 are removed from the furnace and are found to be diffusion bonded together at the interface between the mating surfaces. The pressure bag 20 is of no further use and will need to be replaced.

I claim:

1. A method of diffusion bonding together two metal components comprising the steps of:
   (a) preparing mating surfaces of two components to be diffusion bonded to a condition such that diffusion bonding across the interface between the surfaces is possible,
   (b) applying the two components to each other so that the surfaces are in mating abutment,
   (c) placing the two components with the surfaces in mating abutment in a vacuum furnace,
   (d) evacuating the furnace,
   (e) increasing the temperature of the furnace to a predetermined temperature,
   (f) applying pressure across the interface between the components,
   (e) maintaining the vacuum, temperature and said pressure within the furnace for a first predetermined period of time,
   (f) back filling the furnace with an inert gas when said first predetermined period of time is complete,
   (g) increasing pressure of said gas to a predetermined pressure,
   (h) maintaining said predetermined pressure and temperature for a second predetermined period of time,
   (i) reducing the pressure to atmospheric when the second predetermined period of time is complete, and
   (j) removing the diffusion bonded components from the furnace.

2. A method as claimed in claim 1 wherein placing the components in the furnace includes placing the components in a yoke within the furnace, there being provided means to apply pressure between the yoke and the components.

3. A method as claimed in claim 2 wherein the means to apply pressure between the components and the yoke is a gas-filled container of flexible sheet material located between the components and the yoke whereby increase of temperature in the furnace will increase the pressure within the container and thereby increase the pressure between the yoke and the components.

4. A method as claimed in claim 1 wherein the preparation of the mating surfaces includes preparing the surfaces to a smoothness of 1 micron or better, followed by chemical cleaning.

5. A method as claimed in claim 1 wherein the evacuation of the furnace is to $10^{-4}$ Torr pressure or less.

6. A method as claimed in claim 1 wherein, where the components are made of a titanium alloy, the temperature is preferably 960° C., the first predetermined period of time is about 30 minutes, the predetermined gas pressure is about 15000 psi, and the second predetermined period of time is about 2 hours.

* * * * *